C. DUEKER.
LAND VEHICLE.
APPLICATION FILED MAR. 25, 1920.
1,368,027.
Patented Feb. 8, 1921.
2 SHEETS—SHEET 1.
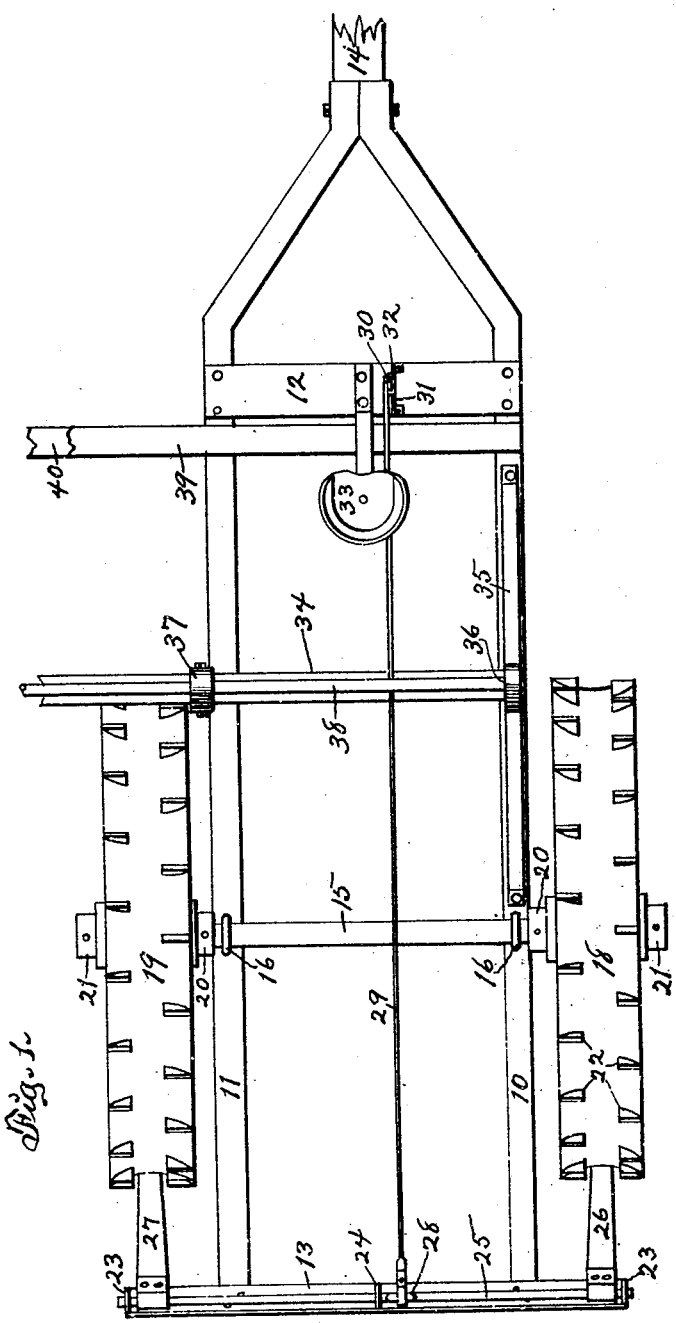

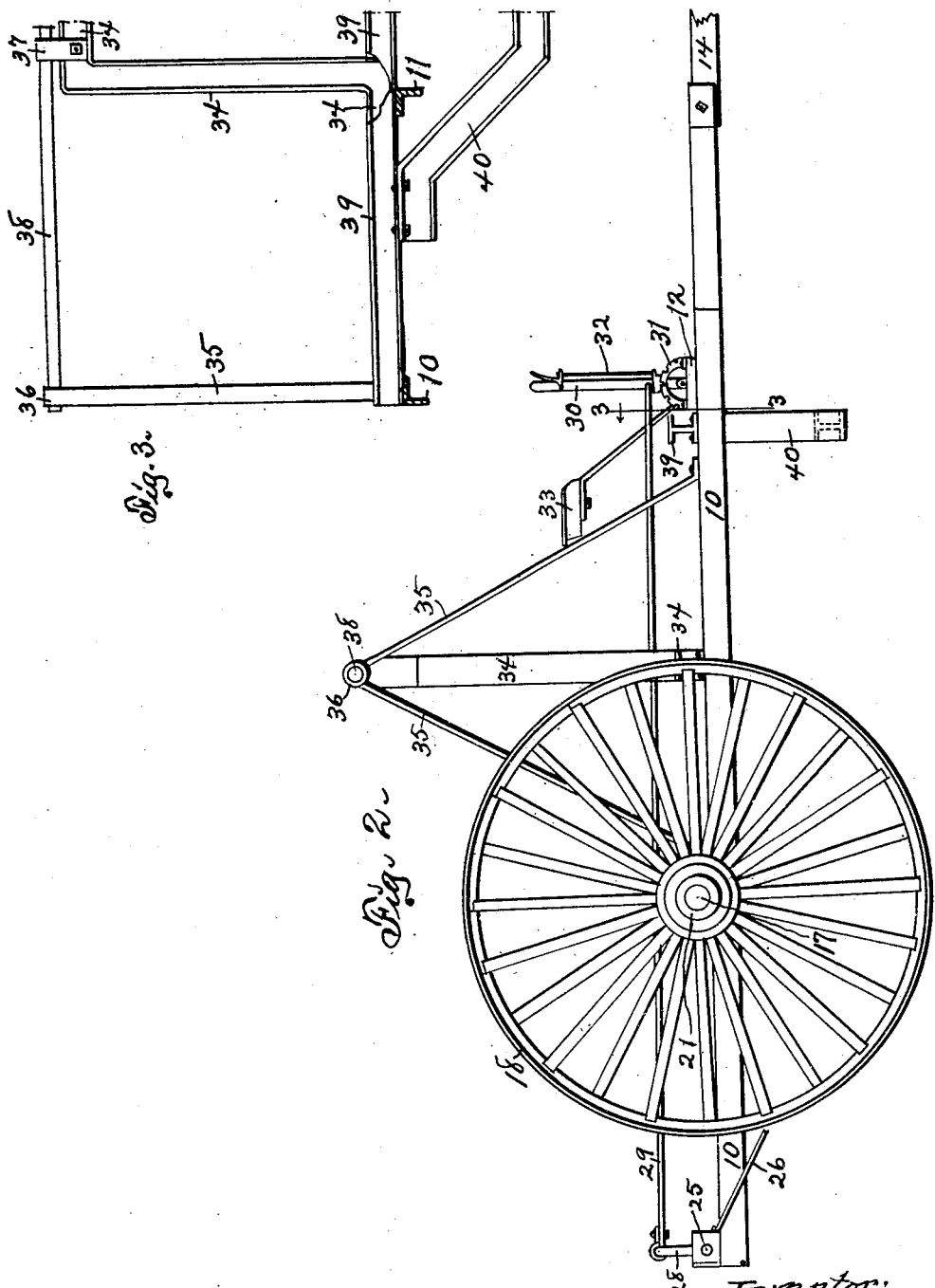

UNITED STATES PATENT OFFICE.

CARL DUEKER, OF COOPER TOWNSHIP, WEBSTER COUNTY, IOWA.

LAND-VEHICLE.

1,368,027.  Specification of Letters Patent.  Patented Feb. 8, 1921.

Application filed March 25, 1920. Serial No. 368,705.

*To all whom it may concern:*

Be it known that I, CARL DUEKER, a citizen of the United States of America, and resident of Cooper township, Webster county, Iowa, have invented a new and useful Improvement in Land-Vehicles, of which the following is a specification.

The object of this invention is to provide improved means for carrying, supporting and transporting mechanism, such as corn-harvesting devices.

A further object of this invention is to provide a land vehicle adapted to carry and transport mechanism, such as corn-harvesting devices, susceptible of being driven by power carried on the vehicle or by traction of the vehicle.

A further object of this invention is to provide improved means, adapted to be carried on a land vehicle, for the support of mechanism laterally of the land vehicle, one example of such mechanism being corn-harvesting devices.

My invention consists in construction, arrangement and combination of elements hereinafter set forth, pointed out in my claims and illustrated by the accompanying drawing, in which—

Figure 1 is a plan of a land vehicle embodying my improvements, portions of the laterally-extending supporting devices being broken away. Fig. 2 is a side elevation of the same. Fig. 3 is a cross-section on the indicated line 3—3 of Fig. 2, a portion of the supporting devices being broken away to reveal posterior elements.

In the construction of the vehicle as shown the numerals 10, 11 designate beams, preferably made of angle iron with one flange horizontal and the other flange extending downwardly therefrom, which beams are arranged in parallel spaced relation and are connected between their ends by suitable cross-bars or plates 12, 13. Forward end portions of the beams 10, 11 are arranged in converging planes and a pole or tongue 14 is mounted between and fixed thereto and extends forwardly therefrom when desired. A suitable support may be provided for the forward end portions of the beams or tongue such as by way of a tongue truck or by attachment to a tractor, not shown. An axle 15, preferably angular in cross-section is mounted transversely of and clamped to the beams 10, 11, intermediate of their ends, by U-bolts 16 and end portions of said shaft project, in the form of spindles 17, on opposite sides of the beams. Wheels 18, 19, of any suitable construction, are mounted for rotation on the spindles 17 and said wheels may carry sprocket on gear driving devices of common form (not shown) for the purpose of driving mechanism carried by the vehicle. The wheels 18, 19 are held in place on the spindles by flanged collars 20, 21 mounted on and pinned to the spindles on opposite sides of and in contact with the hubs of the wheels. When the wheels are employed for traction purposes suitable lugs or cleats 22 may be mounted on the rims thereof in spaced relation both circumferentially and laterally of said rims. The rims of the wheels preferably are concaved. The cross-bar 13 projects at each end across the planes of the wheels and preferably is made of angle form with one flange horizontal and secured to the rear ends of the beams 10, 11 and the other flange extending upwardly from the rear margin of the first flange. Bearings 23 are formed on the ends of the bar 13 and another bearing 24 preferably is located in the center of said bar and a crank-shaft 25 is journaled in said bearings. Scraper arms 26, 27 are fixed to end portions of the crank-shaft 25 adjacent to the bearings 23 and extend forwardly and downwardly therefrom, said arms being adapted to engage at times with the rims of the wheels 18, 19 in the spaces between the rows of lugs or cleats on said rims. The shaft 25 is formed with a crank 28 adjacent to the bearing 24 and a rod 29 connects said crank to a hand-lever 30 mounted on the cross-bar 12 and rising therefrom. A suitable toothed segment 31 is mounted on the cross-bar 12 and is adapted to be engaged by detent devices 32 on the hand-lever 30 to lock said hand-lever, crank shaft 25 and scraper arms 26, 27 in any positions in which they may be placed manually. A seat 33, for an operator, is mounted on the cross-bar 12 adjacent to the hand-lever 30. It is to be understood that the cross-bar 12 represents any suitable platform or floor which may be provided on the beams 10, 11 for convenience of the operator. An I-beam 34 extends transversely of and is fixed to the beams 10, 11 and adjacent to the beam 11 said I-beam is offset upwardly and then projected laterally to the left of said beam in a horizontal plane to a suitable distance for the purpose of supporting mechanism, such as corn-harvesting devices shown in my companion application co-pending in the Patent Office. A support 35 is mounted on and rises from the beam 10 and a bearing 36 is carried by said support and registers with a bearing 37 carried by the uppermost portion of the I-beam 34. A shaft 38 is journaled in the bearings 36, 37 and is adapted to drive the mechanism supported, in part, by said I-beam. The shaft 38 is adapted to be driven by gearing to one or both of the wheels 18, 19 or by a power plant carried on the beam 10, 11, said driving connections being common and well known and susceptible of adaption selectively. An I-beam 39 is fixed to and extends transversely of the beams 10, 11 parallel with and in front of the I-beam 34 and one end portion of said I-beam 39 projects to the left of the beam 11 in front of and in a lower plane than the laterally projecting portion of the I-beam 34 and is adapted to support in part other mechanism such as is shown in my co-pending application above referred to. An I-beam 40 offset downwardly between its ends is fixed to and beneath the I-beam 39 and extends laterally beneath the projecting portion of said I-beam and is adapted to support, in part, the mechanism shown in my co-pending application above referred to.

Through manipulation of the lever 30 the scraper arms 26, 27 may be caused to engage the rims of the wheels 18, 19 at times and remove accumulations of soil and trash therefrom.

I claim as my invention—

1. A land vehicle, comprising a suitable horizontal frame, a suitable truck therefor, two beams extending transversely of and fixed to and projecting at one end each laterally from said frame, one of said beams being substantially horizontal throughout its length, the other of said beams being offset between its ends so that its projecting portion is at greater altitude than its body portion and the other beam.

2. A land vehicle, comprising a suitable frame, a suitable truck therefor, and three beams mounted transversely of and projecting at one end each laterally from said frame, one of said beams being substantially horizontal throughout its length, another of said beams being located at the rear of the first beam and offset upwardly between its ends so that its projecting portion is at greater altitude than the projecting portion of the first beam, the third beam being offset downwardly between its ends so that its projecting portion is at lower altitude than and in the same vertical plane with the projecting portion of the first beam.

Signed at Des Moines, in the county of Polk and State of Iowa, this 18th day of March, 1920.

CARL DUEKER.